(12) United States Patent
Furutani

(10) Patent No.: US 8,915,337 B2
(45) Date of Patent: Dec. 23, 2014

(54) BRAKE DEVICE

(71) Applicant: Mitsubishi Heavy Industries, Ltd., Tokyo (JP)

(72) Inventor: Hideki Furutani, Tokyo (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 124 days.

(21) Appl. No.: 13/651,548

(22) Filed: Oct. 15, 2012

(65) Prior Publication Data

US 2013/0098719 A1 Apr. 25, 2013

(30) Foreign Application Priority Data

Oct. 19, 2011 (JP) .................................. 2011-229523

(51) Int. Cl.
| | | |
|---|---|---|
| *F16D 65/56* | (2006.01) | |
| *B61H 1/00* | (2006.01) | |
| *F16D 65/54* | (2006.01) | |
| *B60T 1/04* | (2006.01) | |
| *B61H 15/00* | (2006.01) | |
| *F16D 65/18* | (2006.01) | |

(52) U.S. Cl.
CPC .................. *B61H 15/00* (2013.01); *B61H 1/00* (2013.01); *F16D 65/54* (2013.01); *B60T 1/04* (2013.01); *F16D 65/18* (2013.01)
USPC .................. 188/202; 188/196 BA; 188/196 V

(58) Field of Classification Search
USPC ............ 188/196 B, 196 BA, 196 V, 197, 198, 188/200, 202
See application file for complete search history.

(56) References Cited

U.S. PATENT DOCUMENTS

| | | | | |
|---|---|---|---|---|
| 2,940,553 A | * | 6/1960 | Newell et al. ........... | 188/196 BA |
| 3,707,208 A | * | 12/1972 | Kyllonen ................ | 188/196 BA |
| 4,977,792 A | * | 12/1990 | Nagano ...................... | 188/24.12 |

FOREIGN PATENT DOCUMENTS

| | | |
|---|---|---|
| JP | 48-19980 | 3/1973 |
| JP | 52-164684 | 12/1977 |
| JP | 59-67642 | 5/1984 |
| JP | 59-192665 | 11/1984 |
| JP | 59-192666 | 11/1984 |
| JP | 60-100259 | 7/1985 |

(Continued)

OTHER PUBLICATIONS

Korean Notice of Preliminary Rejection issued Oct. 24, 2013 in corresponding Korean Patent Application No. 10-2012-114770 with English translation.

(Continued)

*Primary Examiner* — Thomas J Williams
(74) *Attorney, Agent, or Firm* — Wenderoth, Lind & Ponack, LLP.

(57) ABSTRACT

A brake device includes: a damper; an advancing and retreating member; and a gap adjustment mechanism. The gap adjustment mechanism has: a control section having a control surface facing an opposite side to a braking direction; an operation member whose movement is controlled by contacting the control surface as the advancing and retreating member advances towards the braking side in the braking direction, thereby enabling relative movement with respect to the advancing and retreating member towards the opposite side to the braking direction; and a position adjustment section which, when the advancing and retreating member advances towards the braking side in the braking direction, and the operation member relatively moves with respect to the advancing and retreating member, changes an initial position of the advancing and retreating member according to the relative movement amount of the operation member.

2 Claims, 15 Drawing Sheets

(56) References Cited

FOREIGN PATENT DOCUMENTS

| | | |
|---|---|---|
| JP | 61-150863 | 7/1986 |
| JP | 3280970 | 5/2002 |
| JP | 2005-331022 | 12/2005 |
| JP | 2007-203879 | 8/2007 |
| JP | 2011-122703 | 6/2011 |

OTHER PUBLICATIONS

Japanese Notice of Reasons for Rejection issued Aug. 13, 2013 in corresponding Japanese Patent Application No. 2011-229523 with English translation.
Notice of Allowance issued Apr. 29, 2014, in corresponding Korean Application No. 10-2012-0114770 (with English translation).

* cited by examiner

Y1 ←— Y —→ Y2

Prior Art

Prior Art

Prior Art

Prior Art

BRAKE DEVICE

BACKGROUND OF THE INVENTION

1. Field of the Invention

The present invention relates to a brake device which applies a braking force to a braking target such as a wheel. Priority is claimed on Japanese Patent Application No. 2011-229523, filed Oct. 19, 2011, the contents of which is incorporated herein by reference.

2. Description of Related Art

As a brake device that applies a braking force to a wheel, there is known a configuration that generates a braking force by pushing a brake shoe (damper) against the tread surface of a turning wheel. In this type of brake device, to prevent cumulative wear on the tread surface from widening the gap between the brake shoe and the tread surface, there is typically a configuration which incorporates an automatic gap adjustment mechanism (for example, Japanese Unexamined Patent Application, First Publication No. S 59-192666).

An automatic gap adjustment mechanism is one which, when widening of the gap increases the stroke of the brake shoe, the gap is kept constant by moving the initial stroke position (the position before braking) of the brake shoe towards the tread surface.

FIG. 9 shows an example of a brake device with an automatic gap adjustment mechanism. In this brake device 101, a push rod 128 which advances towards the braking side in the braking direction by means of a piston unit 108, pushes out a brake shoe 102 (see FIG. 11) connected to the leading end thereof.

The automatic gap adjustment mechanism includes a gap adjustment unit 140 and a cam 141. The gap adjustment unit 140 includes; a sleeve 127, a ratchet gear 144, an adjustment unit housing 145 serving as a casing, and an adjustment push rod 147. The sleeve 127 is axially rotatable about an axis extending in the braking direction X, and threadably engaged with the outer peripheral surface of the push rod 128 connected to the brake shoe 102. The ratchet gear 144 is attached to the outer periphery of the sleeve 127. A pawl 148 is provided integral with the adjustment push rod 147. The cam 141 has an incline surface which is inclined so that it approaches the push rod 128 in a direction towards the braking side X1 in the braking direction.

The adjustment unit housing 145 is movable together with the sleeve 127 in the braking direction X, and is configured to be prevented from axially rotating about the braking direction X by a guide (not shown in the figure).

When the brake device 101 is to generate a braking force, the sleeve 127 is advanced towards the braking side X1 in the braking direction by driving the piston unit 108, thereby pushing the push rod 128 threadably engaged with the sleeve 127 until the brake shoe 102 contacts the tread surface.

Next, the operation of a conventional automatic gap adjustment mechanism is described. FIG. 10A to FIG. 10D explains how the adjustment push rod 147 moves when the sleeve 127 advances towards the braking side X1 in the braking direction. In FIG. 10A to FIG. 10D, the depth direction on the page corresponds to the braking direction X.

First, with advancing movement of the sleeve 127 and the push rod 128, a roller 154 provided at the end of the adjustment push rod 147 rolls upon the incline surface of the cam 141. As a result, the adjustment push rod 147, from a pre-braking position shown in FIG. 10A, moves towards the ratchet gear 144 as shown in FIG. 10B. Then the pawl 148 disposed so as to engage the ratchet gear 144 moves with the adjustment push rod 147.

If the gap is less than a prescribed value, and the push rod 128 has advanced by less than the prescribed value, the amount of lift of the roller 154 (the movement of the adjustment push rod 147) is insufficient for the pawl 148 to ride over a tooth of the ratchet gear 144, and the ratchet gear 144 returns to the pre-braking state (FIG. 10A) without rotating.

Here, as shown in FIG. 10C, when the pawl 148 moves by a predetermined adjustment value or more (that is, wear of the tread surface causes the push rod 128 to advance by a prescribed value or more), the pawl 148 rides over a tooth of the ratchet gear 114, and engages with the tip of the next tooth. When braking of the brake device 101 is released from this state, then as the push rod 128 moves towards the opposite side X2 to the braking side in the braking direction, the adjustment push rod 147 also moves towards the opposite side X2 to the braking side in the braking direction, and by rolling over the incline surface of the cam 141, moves in a direction away from the ratchet gear 144 (downward on the page).

Therefore, as shown in FIG. 10D, the tip of the pawl 148 which moves together with the adjustment push rod 147 rotates the ratchet gear 144 by one tooth only. Due to the rotation of the ratchet gear 144, the sleeve 127 integral with the ratchet gear 144 via a key also rotates, and the push rod 128 threadably engaged with the sleeve 127 adjusts the position by moving towards the braking side X1 in the braking direction.

As shown in FIG. 11, the leading end section of the push rod 128 is attached to a hanger 105 connected by a pin to the leading end of an arm section 107 provided on the top of the casing 106 of the brake device 101. That is to say, because the hanger 105 swings about the leading end of the arm section 107, the stroke of the leading end section of the push rod 128 exhibits a curve whose arc is centered on the leading end of the arm section 107.

However, when repeated adjustments, occurring as wear of the tread surface (braking target) progresses, cause the initial stroke position of the push rod 128 to move towards the braking side X1 in the braking direction, a problem occurs in that the movement of the adjustment push rod 147 relative to the distance moved (stroke) by the push rod 128 and the gap adjustment unit 140 under braking is small. This phenomenon is described below.

First, the amount of lift of the adjustment push rod 147 when there is no wear of the tread surface is described.

FIG. 12A shows the adjustment push rod 147 at the initial stroke position in a case where there is no wear of the tread surface, and FIG. 12B shows the adjustment push rod 147 at the braking position. As shown in FIG. 12A and FIG. 12B, when the tread surface is unworn, and the initial stroke position of the push rod 128 is positioned sufficiently towards the opposite side X2 to the braking side in the braking direction, supposing that the incline surface of the cam 141 is inclined by 20 degrees with respect to the braking direction X, a 21 mm stroke of the push rod 128 causes the adjustment push rod 147 (roller 154) to lift by 7.9 mm. Specifically, a proportional relationship exists whereby the adjustment push rod 147 lifts by approximately 1 mm for every 2.6 mm of stroke of the push rod 128.

Moreover, for example, in a configuration where the pawl 148 rides over a tooth of the ratchet gear 144 when the adjustment push rod 147 lifts by 5.4 mm, gap adjustment takes place when the push rod 128 undergoes a stroke of 14 mm.

FIG. 13 shows the adjustment push rod 147 at the braking position in a case where wear of the tread surface has progressed (90 mm in this case). As shown in FIG. 13, when wear of the tread surface has progressed moving the initial stroke position 90 mm towards the braking side X1 in the braking direction, the curved stroke of the push rod 128 causes the central axis F of the adjustment push rod 147 to adopt a slight incline. In contrast, because the cam 141 is secured to the side of the casing 106 which is unaffected by swinging of the arm section 107, the stroke distance of the push rod 128 is no longer in proportion to the amount of lift of the adjustment push rod 147. That is to say, because the longitudinal direction of the push rod 128 is at an incline relative to the angle of inclination of the cam 141 and the expected lift direction, if the push rod 128 in the above example moves 21 mm in the braking direction X, the adjustment push rod 147 only lifts by 3.9 mm.

That is to say, in the brake device configured so a 5.4 mm lift of the adjustment push rod 147 causes the pawl 148 to ride over a tooth of the ratchet gear 144, the automatic gap adjustment mechanism does not work, resulting in an inability to maintain a constant gap between the tread surface and the brake shoe 2.

SUMMARY OF THE INVENTION

The present invention provides a brake device which can reliably adjust the gap between the braking target and the damper, even in situations where wear of the braking target has progressed and the initial position of the brake shoe has moved towards the braking side X1 in the braking direction.

According to a first aspect of the present invention, a brake device of the present invention includes: a damper which applies a braking force to a braking target by advancing towards and contacting the braking target; an advancing and retreating member which causes the damper to advance and retreat in a braking direction towards the braking target; and a gap adjustment mechanism which adjusts an initial position of the damper and the advancing and retreating member.

The gap adjustment mechanism includes: a control section having a control surface facing an opposite side to the braking side in the braking direction; an operation member which is capable of advancing and retreating in the braking direction together with the advancing and retreating member, and whose movement is controlled by contacting the control surface as the advancing and retreating member advances towards the braking side in the braking direction, thereby enabling relative movement with respect to the advancing and retreating member towards the opposite side to the braking side in the braking direction; and a position adjustment section which, when the advancing and retreating member advances towards the braking side in the braking direction by a predetermined advance amount or more and the operation member relatively moves by a predetermined amount with respect to the advancing and retreating member, changes the initial position of the advancing and retreating member according to the relative movement amount of the operation member.

According to the brake device described above, the operation member moves along the braking direction, and the position adjustment section changes the initial position of the advancing and retreating member according the relative movement of the operation section towards the opposite side in the braking direction. Consequently, even if wear of the braking target progresses to the extent that the initial position of the damper moves in a curve towards the braking side in the braking direction, the gap between the braking target and the damper can be adjusted accurately.

According to a second aspect of the present invention, the position adjustment section includes: a sleeve which is axially rotatable about an axis extending in the braking direction and whose inner peripheral surface is threadably engaged with the advancing and retreating member; a ratchet gear which is axially rotatable about the axis extending in the braking direction together with the sleeve; a lever member which is rotatable with movement of the operation member, about a fulcrum that advances and retreats in the braking direction together with the advancing and retreating member; and a pawl which is provided so as to be capable of advancing and retreating in a predetermined direction according to the rotation of the lever member, and which turns the ratchet gear by moving towards the application side in a predetermined direction while engaged with the ratchet.

According to the brake device described above, rotation of the lever member causes the pawl to move, and the pawl causes the ratchet and sleeve to rotate, thereby changing the initial position of the advancing and retreating member. Consequently, the initial position does not return to the opposite side to the braking side in the braking direction.

According to a third aspect of the present invention, the control section may be formed in a polygonal column shape and provided so as to be axially rotatable about the peripheral surfaces, such that one of the plurality of peripheral surfaces so as to be capable of being selected as the control surface by performing axial rotation.

According to a fourth aspect of the present invention, the plurality of control surfaces may each be formed at different distances from a center axis.

According to the brake device described above, the distance of the operation member to the control surface can be changed easily, allowing the timing of gap adjustment to be adjusted.

According to the brake device described above, the operation member moves along the braking direction, and the position adjustment member changes the initial position of the advancing and retreating member according to the relative movement amount of the operation member. Consequently, even if wear of the braking target has advanced to the extent that the initial position of the damper moves in a curve towards the braking side in the braking direction, the gap between the braking target and the damper can be reliably adjusted.

DETAILED DESCRIPTION OF THE INVENTION

Embodiments of the present invention are described in detail below with reference to the drawings.

Figure 1:
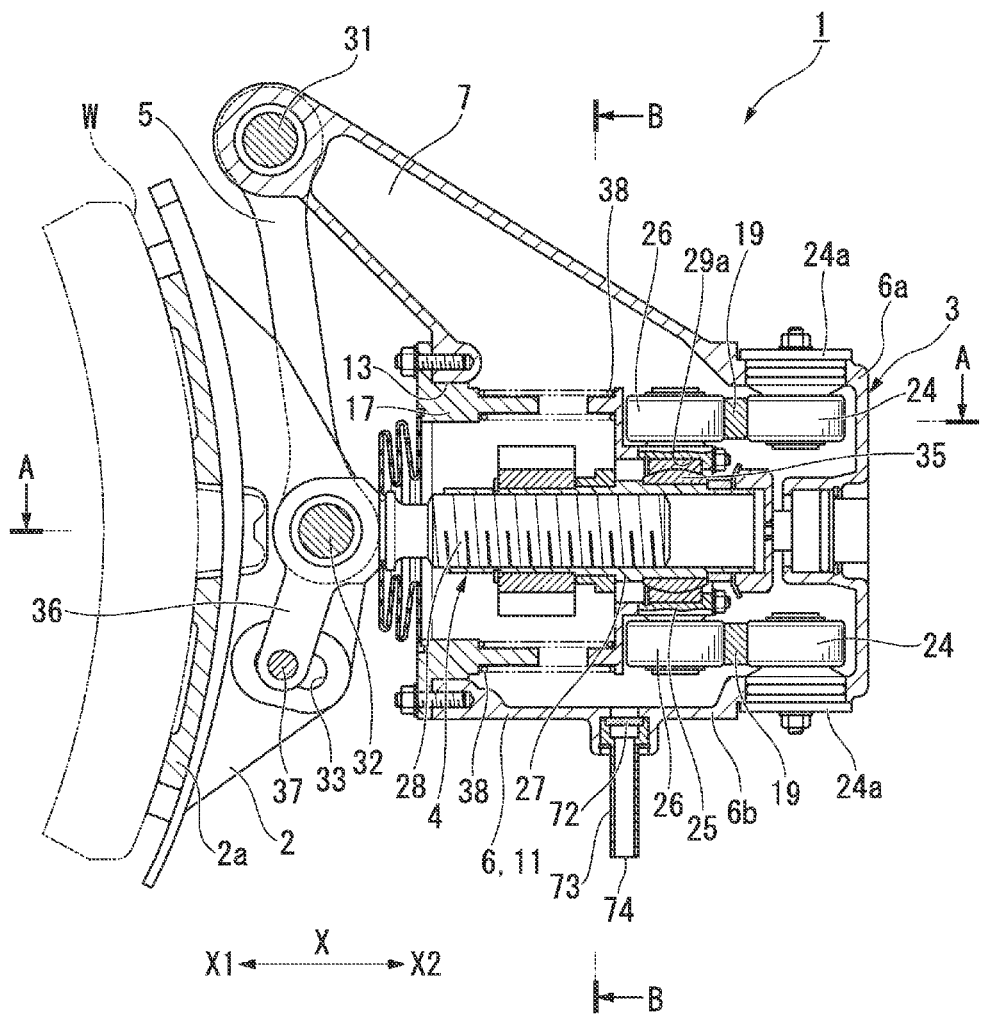
FIG. 1 is cutaway cross-sectional view showing the main components of a brake device according to an embodiment of the present invention.

As shown in FIG. 1, a brake device 1 of the present embodiment is a brake device for use with railway vehicles, more specifically a single-shoe tread brake unit which pushes a brake shoe (damper) 2 against a tread surface W of a wheel from one side. The brake device 1 is disposed obliquely upward of the wheel, and is mounted to the vehicle at a mounting section 23 (see FIG. 2A) via bolts or the like.

As shown in FIG. 1, the brake device 1 includes as its main components; a brake shoe 2, a main unit 3 including an advancing and retreating unit 4, and a hanger 5. The brake shoe 2 contacts the tread surface W of the wheel serving as the braking target, and applies a braking force to the wheel. The advancing and retreating unit 4 moves the brake shoe 2 in a direction towards or away from the wheel. The hanger 5 movably supports the brake shoe 2.

The brake shoe 2 is a member which generates a braking force when pushed against the tread surface W of a wheel, and is provided with a brake friction material 2a in the form of a curved plate at the point of contact with the tread surface W. The brake shoe 2 is connected to the hanger 5 by a connecting pin 32 serving as a pivot axis. Furthermore, a little below the pivot axis of the brake shoe 2, an incline adjustment opening 33 is formed. The incline adjustment opening 33 is described in detail later.

The main unit 3 has a casing 6 which provides its external shape, and on top of the casing 6, an arm section 7 which extends diagonally upward, is formed in an integrated manner. One end of the hanger 5 is pivotably attached to the leading end of the arm section 7 via a connecting pin 31. Accordingly, the hanger 5 can swing about a pivot point located at one end of the hanger 5. That is to say, when the hanger 5 pivots about the connecting pin 31, the brake shoe 2 connected to the other end of the hanger 5 moves relative to the main unit 3. Furthermore, the connection between the arm section 7 and the hanger 5 incorporates a torsion coil spring (not shown in the figure). The role of this torsion coil spring is to urge the brake shoe 2 in a direction away from the wheel.

Figure 2A:
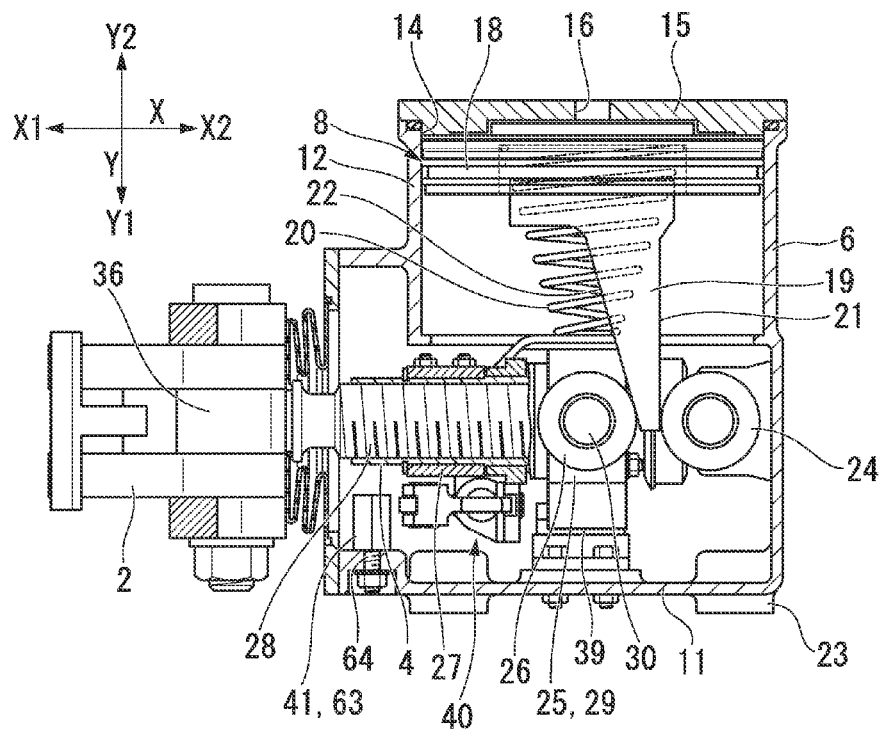
FIG. 2A is a cross-sectional view taken along the line A-A in FIG. 1, showing a state before insertion of a wedge member.

As shown in FIG. 2A, the inside of the casing 6 of the main unit 3 has; a piston unit 8, the advancing and retreating unit 4, and a pair of fixed rollers 24. The piston unit 8 generates a driving force for moving the brake shoe 2. The advancing and retreating unit 4 transmits this driving force to the brake shoe 2. The pair of fixed rollers 24 is employed when the advancing and retreating unit 4 advances or retreats. Only one fixed roller 24 is shown in FIG. 2A.

In the main unit 3, when a piston 18 that constitutes the piston unit 8 advances or retreats in response to a driving force produced by air pressure, the advancing and retreating unit 4 also advances or retreats via wedge members 19 to be described later. As a result, the brake shoe 2 attached to the advancing and retreating unit 4 is pressed against the tread surface W of the wheel.

Here, in the present embodiment, the advancing and retreating direction of the piston 18 of the piston unit 8 is orthogonal to the advancing and retreating direction of the advancing and retreating unit 4.

Furthermore, in the description below, the advancing and retreating direction of the advancing and retreating unit 4 and the brake shoe 2 is referred to as the braking direction X, and the advancing and retreating direction of the piston 18 (and the wedge members 19 described later) is referred to as the drive direction Y. The side approached to induce braking of the wheel is referred to as the application side, and the side approached to release the brake is referred to as the release side.

That is to say, in FIG. 1, the left side is the braking side X1 in the braking direction, and the right side is the opposite side X2 to the braking side in the braking direction. Similarly, in FIG. 2A and FIG. 2B, the bottom is the application side Y1 in the drive direction, and the top is the release side Y2 in the drive direction. Furthermore, the upward direction in FIG. 1, being the direction orthogonal to the drive direction Y and the braking direction X, is referred to as above, and the direction opposite to the upward direction is referred to as below.

The casing 6 includes a cylindrical main body cylinder 11 having a central axis in the braking direction X, and a piston cylinder section 12 integrally provided to one side of the main body cylinder 11. The main body cylinder 11 has a main body opening section 13 on the braking side X1 in the braking direction, and the piston cylinder section 12 has a piston opening section 14 on the release side Y2 in the drive direction.

The piston unit 8 is provided with; a piston cap 15, a piston 18, a pair of wedge members 19, and a compression coil spring 20. The piston cap 15 covers the piston opening section 14 of the piston cylinder section 12. In the piston cap 15 there is formed a supply opening 16 which introduces compressed air into the piston cylinder section 12. The piston 18 advances and retreats in the drive direction Y inside the piston cylinder section 12. The pair of wedge members 19 are integrally attached to the piston 18. The compression coil spring 20 urges the piston 18 towards the release side Y2 in the drive direction.

The wedge members 19 are flat members with a wedge shape when viewed from above. The equally shaped wedge members 19 are attached to the surface of the piston 18 on the application side Y1 in the drive direction, in a vertically symmetrical arrangement with respect to upper and lower parts of the piston 18. The wedge members 19 have a guide surface 21 along the drive direction Y, and an incline surface 22 formed at an incline relative to the drive direction Y such that the distance from the guide surface 21 gradually increases from the application side Y1 to the release side Y2 in the drive direction. The compression coil spring 20 is such that one end is fixed to the side wall of a sleeve holding member 25 to be described later, and the other end is fixed to the application side Y1 surface of the piston 18 in the drive direction, between the pair of wedge members 19. That is to say, the piston 18 is urged towards the release side Y2 in the drive direction by the compression coil spring 20.

Furthermore, below the main body cylinder 11 of the casing 6, a filter 72 for collecting dust and the like is arranged, and a flow pipe 73 that connects to the filter 72 is arranged in a vertical direction. At the bottom end of this flow pipe 73, a downward facing flow opening 74 is formed, and the internal space of the casing 6 is connected to the atmosphere via this flow opening 74.

Figure 2B:
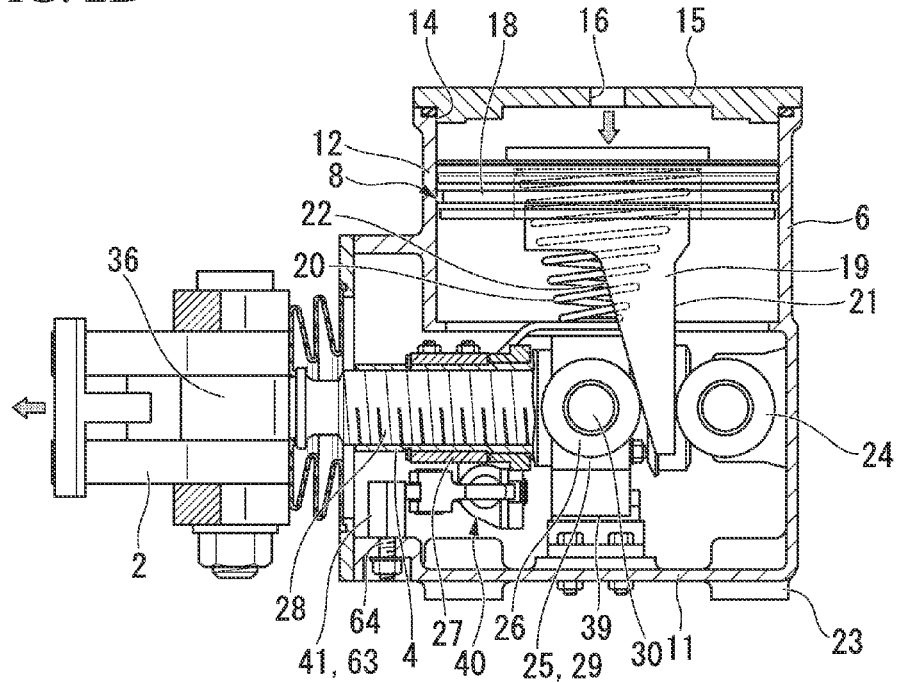
FIG. 2B is a cross-sectional view taken along the line A-A in FIG. 1, showing a state after insertion of the wedge member.

As shown in FIG. 2A and FIG. 2B, the fixed rollers 24 are fixed in such a position that, when the wedge members 19 move in the drive direction Y, the guide surface 21 remains in contact with the outer peripheral surface of the fixed rollers 24, so that the fixed rollers 24 rotate. The fixed rollers 24 are so-called roller followers which rotate when the outer peripheral surface thereof contacts a contact counterpart, and are rotatably attached to fixed roller shafts 24a which extend vertically and are attached to a top wall 6a and a bottom wall 6b of the casing 6.

The advancing and retreating unit 4 includes: a sleeve holding member 25, moving rollers 26, a sleeve 27, and a push rod 28. The sleeve holding member 25 is movable in the braking direction X. The moving rollers 26 are attached to the top and bottom of the sleeve holding member 25. The sleeve 27 is swingably secured to the sleeve holding member 25. The push rod 28 is attached to the end of the sleeve 27 on the braking side X1 in the braking direction.

The sleeve holding member 25 includes a main body 29 and a moving roller shaft 30 extending in the vertical direction of the main body 29, and is configured to be movable in the braking direction X by a slide guide mechanism 39 to be described later.

Figure 3:
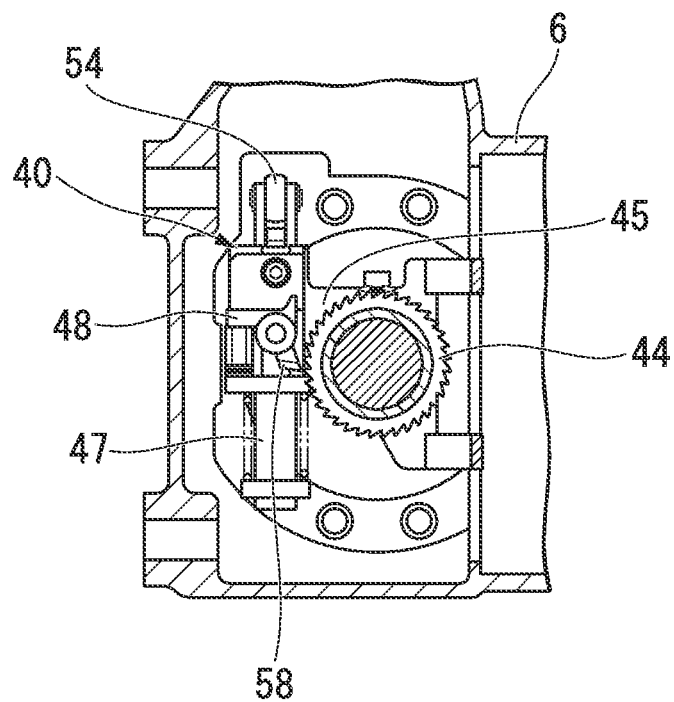
FIG. 3 is a cross-sectional view taken along the line B-B in FIG. 1.
Figure 4:
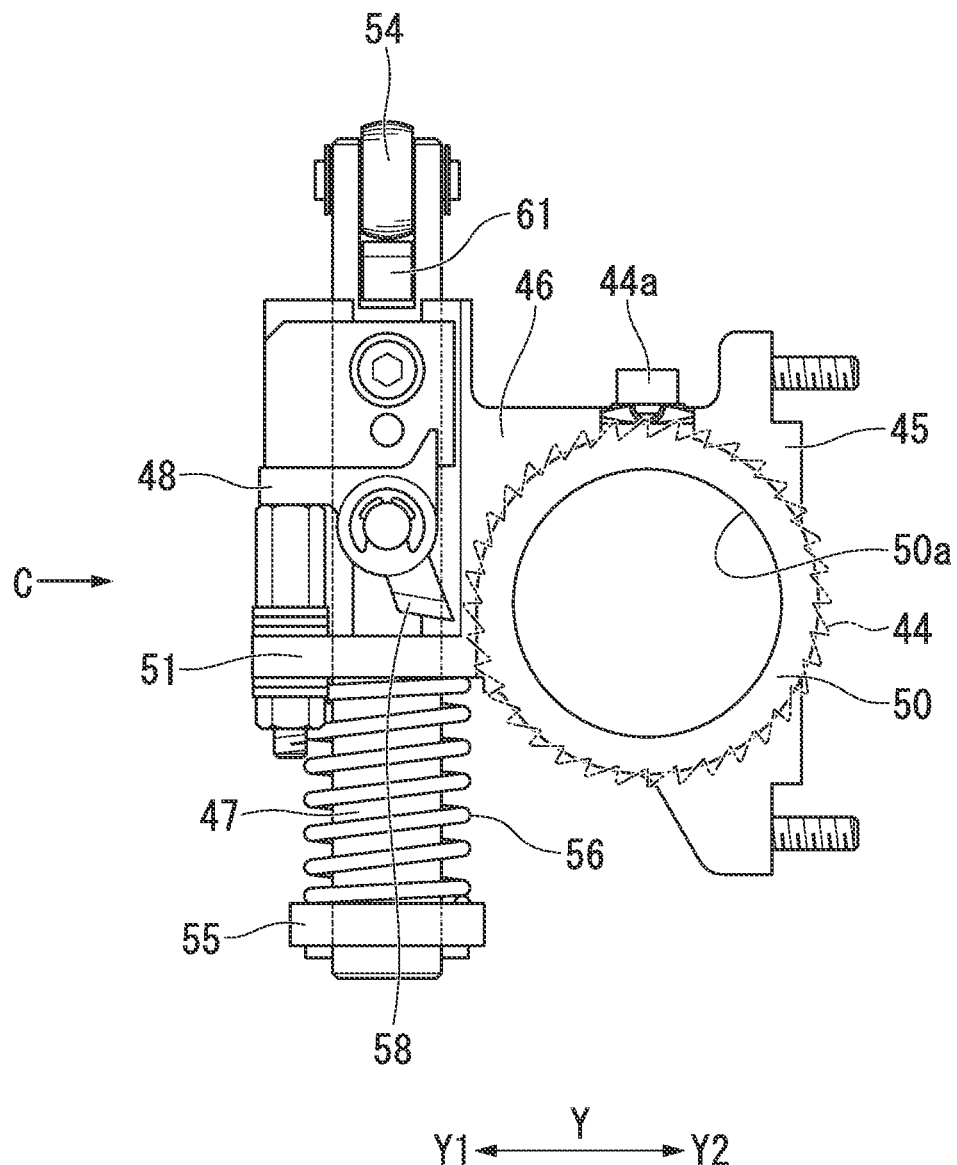
FIG. 4 is an enlarged view of the main components in FIG. 3.

The main body 29 of the sleeve holding member 25 is a substantially cuboid member, in which a mounting hole 29a for mounting a spherical plain bearing 35 is formed so as to pass through the two faces on either side in the braking direction X. Furthermore, as shown in FIG. 3, in a side face 29b of the main body 29, there is formed a groove section 43.

The moving rollers 26 are each rotatably fixed to a moving roller shaft 30. The moving rollers 26 are roller followers similar to the fixed rollers 24, and are positioned so as to contact the incline surfaces 22 when the wedge members 19 move in the drive direction Y.

Furthermore, the spherical plain bearing 35 is mounted in the mounting hole 29a.

The sleeve 27 has a cylindrical shape, and the outer peripheral surface thereof is attached to the sleeve holding member 25 via the spherical plain bearing 35. As a result, the sleeve 27 is able to swing relative to the sleeve holding member 25, and is able to rotate about the central axis of the sleeve 27. Furthermore, there is formed a feed screw (female thread) on the inner peripheral surface of the sleeve 27.

The push rod 28 is an axial member which, as the sleeve 27 moves towards the braking side X1 in the braking direction, pushes the brake shoe 2 attached to the braking side X1 in the braking direction of the push rod 28 against the tread surface W. At the leading end of the push rod 28 on the braking side X1 in the braking direction, there is formed a bend section 36 which extends downward. On the opposite side X2 to the braking side of the push rod 28 in the braking direction, there is formed a feed screw (male thread) which engages with the feed screw of the sleeve 27. The leading end of the bend section 36 is connected to the incline adjustment opening 33 of the brake shoe 2 via a connecting pin 37.

Furthermore, in the main body opening section 13 of the casing 6, there is fitted a casing cap 17 that is formed with a hole in the center through which the push rod 28 can pass. Between the casing cap 17 and the sleeve holding member 25, a plurality of compression coil springs 38 are provided via a plurality of studs provided on both the casing cap 17 and the sleeve holding member 25. As a result, the sleeve holding member 25 is urged towards the opposite side X2 to the braking side in the braking direction.

Here, the mechanism for adjusting the incline of the brake shoe 2 is described. The incline adjustment opening 33 of the brake shoe 2 is formed with an elongated shape so as to allow the brake shoe 2 to tilt at a fixed angle. When an action such as releasing the brake causes the brake shoe 2 to tilt, the incline of the brake shoe 2 can be restricted by the connecting pin 37 contacting the inside wall of the incline adjustment opening 33.

Furthermore, in the brake device 1 of the present embodiment, a gap adjustment mechanism 40 is provided for maintaining a constant brake gap when the brake is being released.

The gap adjustment mechanism 40 is a mechanism that automatically adjusts the gap between the tread surface W of the wheel and the brake shoe 2. That is to say, when wear of the tread surface W of the wheel causes the gap to widen, the mechanism automatically brings the initial stroke position (standby position) of the brake shoe 2 closer to the tread surface W.

Figure 5:
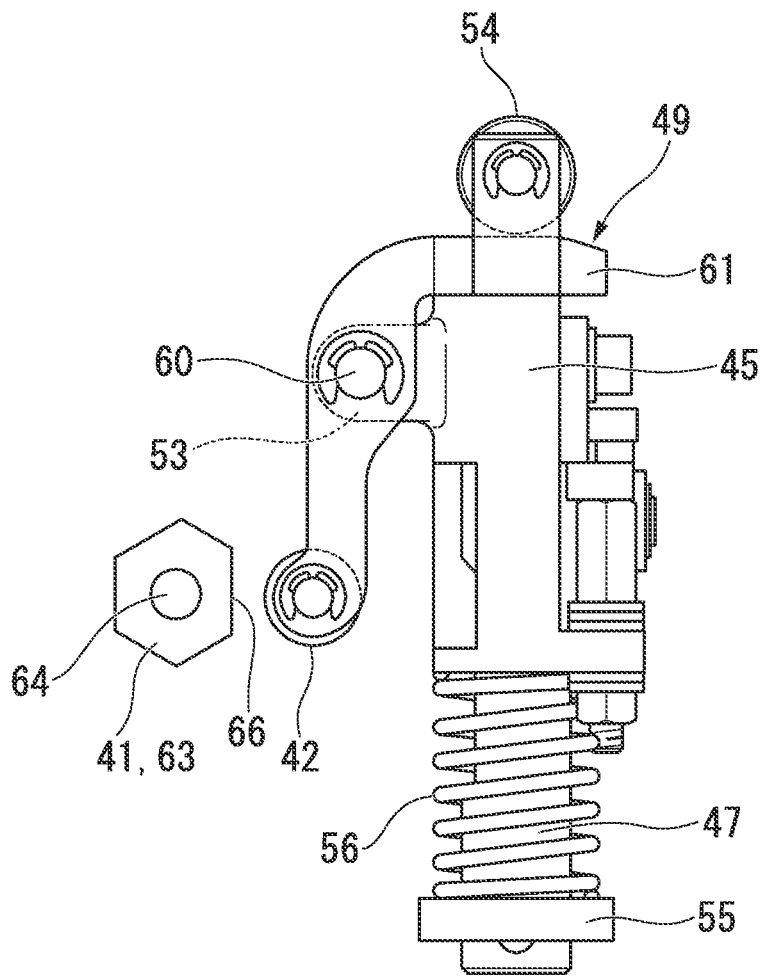
FIG. 5 is a view from C in FIG. 4.
Figure 6:
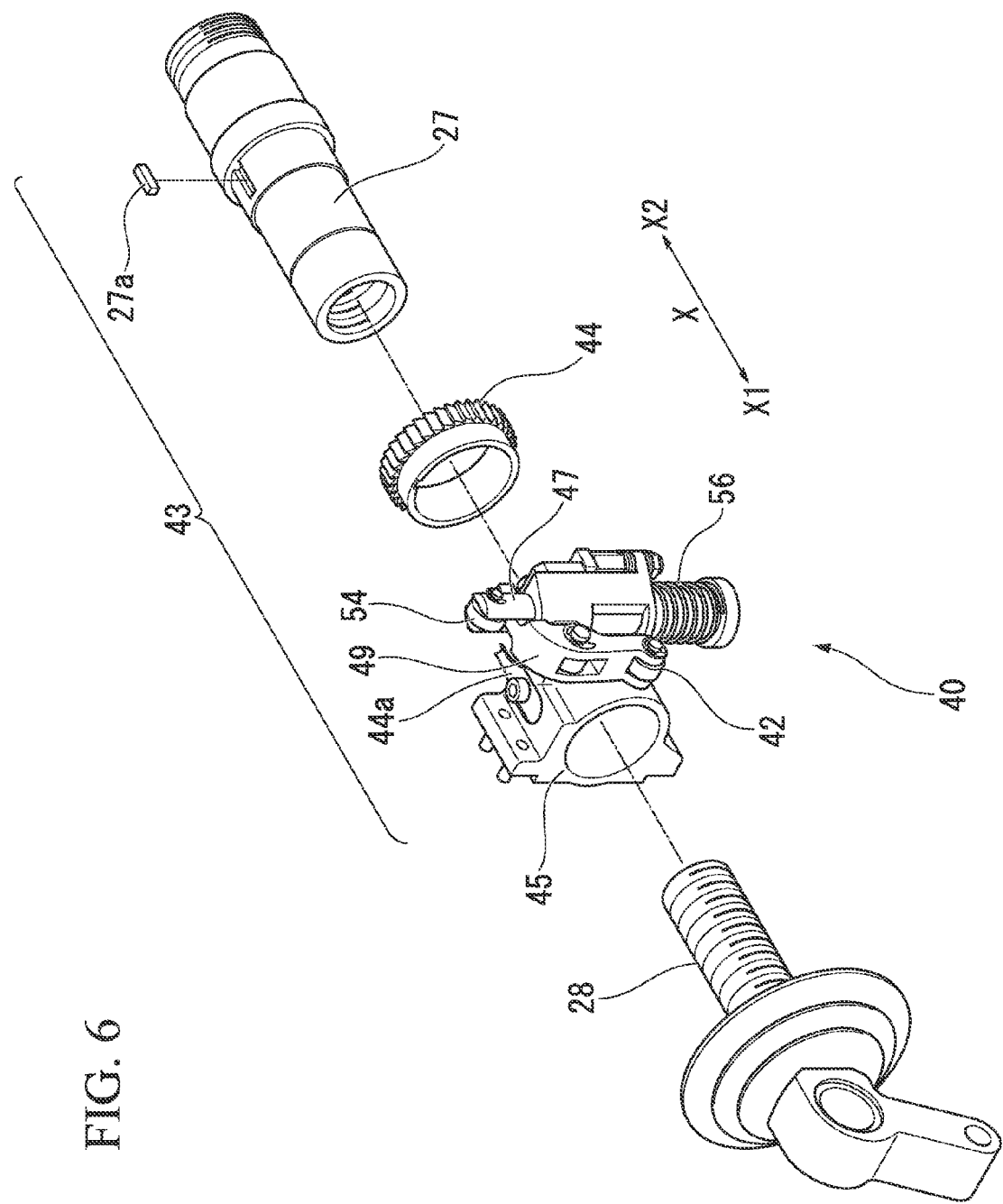
FIG. 6 is an exploded perspective view of a gap adjustment mechanism.

As shown in FIG. 3 to FIG. 6, the gap adjustment mechanism 40 includes; a hexagonal cam 41, a first roller 42, and a position adjustment section 43. The hexagonal cam 41, as shown in FIG. 5, is secured to the casing 6. The first roller 42 contacts the hexagonal cam 41 when the advancing and retreating unit 4 has advanced towards the braking side X1 in the braking direction. The position adjustment section 43 changes the initial position of the push rod 28 according to the relative movement of the first roller 42. The position adjustment section 43 includes; the sleeve 27 described above, a ratchet gear 44 secured to the outer peripheral surface of the sleeve 27, and an adjuster body 45 secured to the sleeve holding member 25.

The ratchet gear 44 is a gear that works with a pawl member 48, described later, to axially rotate the sleeve 27 about an axis extending in the braking direction X, and is attached to the outer peripheral surface of the sleeve 27 by a key 27a (see FIG. 6) so as not to rotate relative to the sleeve 27. Unintentional rotation of the ratchet gear 44 is restricted by a flat spring 44a.

The adjuster body 45 includes as its main components; an adjuster body casing 46, an adjustment push rod 47, a pawl member 48, and a lever member 49. The adjustment push rod 47 is slidably incorporated into the adjuster body casing 46. The pawl member 48 is rotatably attached to the adjustment push rod 47. The lever member 49 is rotatably attached to the adjuster body casing 46.

The adjuster body casing 46 includes a sleeve outer sheath 50 and a push rod outer sheath 51. The sleeve outer sheath 50 has a circular hole 50a. Moreover, the sleeve outer sheath 50 attached to the outer peripheral surface of the sleeve 27 so as to be rotatable with respect to the sleeve 27. The push rod outer sheath 51 supports the adjustment push rod 47 in a slidable manner in a direction orthogonal to the braking direction X.

The circular hole 50a of the sleeve outer sheath 50 is formed with an inside diameter slightly larger than the outside diameter of the outer peripheral surface of the sleeve 27. That is to say, the circular hole 50a is formed such that a gap is present between the circular hole 50a and the sleeve 27. As a result, the adjuster body 45 and the sleeve 27 are able to rotate relative to each other. As described later, the adjuster body 45 is secured to the sleeve holding member 25, and the sleeve 27 (and the ratchet gear 44) are able to rotate with respect to the sleeve holding member 25 and the adjuster body 45.

The push rod outer sheath 51 is provided on the side face of the sleeve outer sheath 50. Furthermore, on the push rod outer sheath 51 there is formed a lever bracket 53 which supports the lever member 49 to be described later.

The adjustment push rod 47 is a rod-shaped member which, in conjunction with movement of the push rod 28, is capable of moving in a direction orthogonal to the braking direction X. To one end of the adjustment push rod 47 is attached a disc-shaped second roller 54. To the other end of the adjustment push rod 47 is attached a spring seat 55, and a compression coil spring 56 is placed between the spring seat 55 and the push rod outer sheath 51. As a result, the adjustment push rod 47 is constantly urged towards the other end.

In the description below, of the longitudinal direction of the adjustment push rod 47, the side to which the second roller 54 is attached is referred to as the roller side, and the opposite side is referred to as the non-roller side.

The pawl member 48 has a pawl 58 which engages with the ratchet gear 44, and is attached to the adjustment push rod 47 so as to be rotatable about an axis along the braking direction X. The pawl member 48 is attached in such a position that, when the adjuster body 45 attached to the adjustment push rod 47 is sheathed by the sleeve 27, the pawl 58 engages with one of the teeth of the ratchet gear 44. More specifically, the pawl member 48 is attached in such a position that the pawl 58, while remaining in contact with a tooth of the ratchet gear 44, rides over the tooth of the ratchet gear 44 when the adjustment push rod 47 makes a large movement towards the roller side.

The lever member 49 is a direction changing member which moves the adjustment push rod 47 in a direction orthogonal to the braking direction X according to the amount of movement of the push rod 28, and is attached to a lever bracket 53 provided on the push rod outer sheath 51 of the adjuster body casing 46 via a pin 60, so as to be rotatable about an axis orthogonal to the braking direction X.

The lever member 49 is a rod-shaped member at the center of which is provided a through hole passed through by the pin 60, and at the end at the braking side X1 in the braking direction is attached the first roller 42 which contacts the hexagonal cam 41 secured to the casing 6. The first roller 42 is configured to contact the hexagonal cam 41 as the adjuster body 45 moves towards the braking side X1 in the braking direction, so that the lever member 49 rotates about the pin 60 due to this contacting.

At the other end of the lever member 49 is formed a drive piece 61. The drive piece 61 is configured such that when the lever member 49 rotates in response to movement of the first roller 42 provided at one end of the lever member 49 towards the opposite side X2 to the braking side in the braking direction, the second roller 54 provided at one end of the adjustment push rod 47 is pushed up in a direction resisting the urging force of the compression coil spring 56.

That is to say, movement of the adjuster body 45 towards the braking side X1 in the braking direction causes the lever member 49 to rotate, pushing the adjustment push rod 47 upwards. Then the pawl member 48 attached to the adjustment push rod 47 also moves in a direction orthogonal to the braking direction X.

Axial rotation of the adjustment push rod 47 along the longitudinal direction is restricted by an adjustment plate (not shown). That is to say, by restricting the rotation of the adjustment push rod 47, an appropriate manner of contact is always maintained between the second roller 54 and the drive piece 61 of the lever member 49.

Next, the hexagonal cam 41 which contacts the first roller 42 of the lever member 49 is described. The hexagonal cam 41 is a substantially hexagonal columnar member, and is secured to the casing 6 such that one of the six control surfaces 66 contacts the first roller 42 when the adjuster body 45 has moved towards the braking side X1 in the braking direction.

The hexagonal cam 41 includes; a main body 63 on which six control surfaces are formed, and an attachment screw section 64 (see FIG. 2A and FIG. 2B) extending from the main body 63. The hexagonal cam 41 is secured to the casing 6 by using a nut to fasten the attachment screw section 64 to the mounting hole provided in the casing 6. At least two of the six control surfaces 66 of the main body 63 are formed at different distances from the central axis.

Next, the operation of the brake device 1 is described.

Here, the brake shoe 2 is positioned at the farthest extent of the opposite side X2 to the braking side in the braking direction, that is at the standby position, and the piston 18 is positioned at the farthest extent of the release side Y2 in the drive direction. The wedge members 19, as shown in FIG. 2A, are in a state where the leading ends thereof are inserted to a small extent between the fixed rollers 24 and the moving rollers 26. That is to say, the moving rollers 26 are in a state closest to the fixed rollers 24.

When a braking force is to be applied to the wheel by the brake shoe 2, compressed air is introduced from the supply opening 16 of the piston unit 8. This drives the piston 18 in the drive direction Y against the urging force of the compression coil spring 20. Therefore the wedge members 19 attached to the piston 18 move in the drive direction Y.

As shown in FIG. 2B, the wedge members 19 enter the space between the fixed rollers 24 and the moving rollers 26. Therefore the moving rollers 26 are subjected to a pressing force in a direction orthogonal to the incline surface 22 of the wedge member 19, in other words, a pressing force having a component of force towards the braking side X1 in the braking direction. This pushing of the moving rollers 26 causes the sleeve holding member 25 attached to the moving rollers 26 to move against the urging force of the compression coil springs 38.

At this time, the slide guide mechanism 39 restricts the movement direction of the sleeve holding member 25 to the braking direction X. Movement of the sleeve holding member 25 towards the braking side X1 in the braking direction causes the brake shoe 2 to move via the sleeve 27 and the push rod 28 towards the braking side X1 in the braking direction, and press against the tread surface W of the wheel, thereby applying braking force.

At this time, accompanying rotation of the hanger 5 about the connecting pin 31 serving as the pivot point, the brake shoe 2 moves towards the braking side X1 in the braking direction while swinging about the connecting pin 31. When this occurs, the leading end on the braking side X1 in the braking direction of the push rod 28 connected to the brake shoe 2 follows the same trajectory. That is to say, the advancing and retreating movement of the push rod 28 is accompanied by swinging of the leading end of the push rod 28. However the sleeve 27 engaged with the end side of the push rod 28 is rendered swingable by the spherical plain bearing 35, so that this swinging movement is absorbed.

To release the braking force applied to the wheel, compressed air is exhausted from the supply opening 16 of the piston unit 8. Whereupon, the compression coil spring 20 which had contracted due to the compressed air expands, and the piston 18 moves towards the release side Y2 in the drive direction, returning to its original position. As a result, the sleeve holding member 25 (advancing and retreating unit 4) is no longer subjected to force from the piston 18 and the wedge members 19 towards the braking side X1 of the braking direction. Consequently, the compression coil springs 38 provided inside the main body cylinder 11 of the casing 6 expand, and the brake shoe 2 moves towards the opposite side X2 to the braking side in the braking direction, returning to its original position. In this case, the slide guide mechanism 39 restricts the movement direction of the sleeve holding member 25 to the braking direction X.

Next, the operation of the gap adjustment mechanism 40 is described in detail with reference to FIG. 7A, FIG. 7B, and FIG. 8.

Figure 7A:
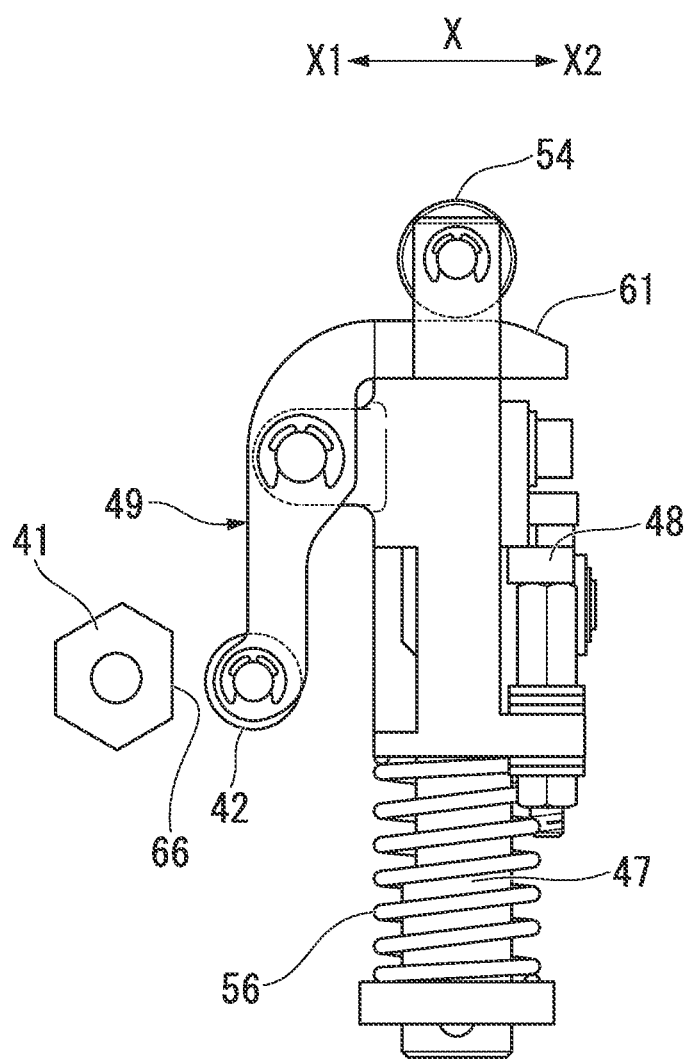
FIG. 7A, FIG. 7B, and FIG. 8 are drawings for explaining the operation of the gap adjustment mechanism.
Figure 8:
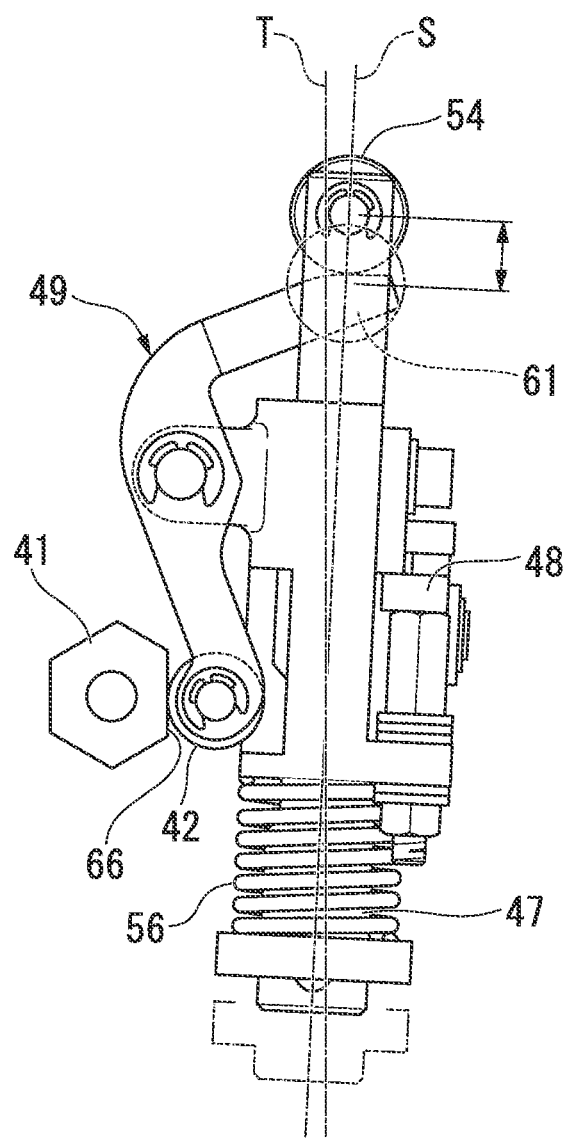
Figure 9:
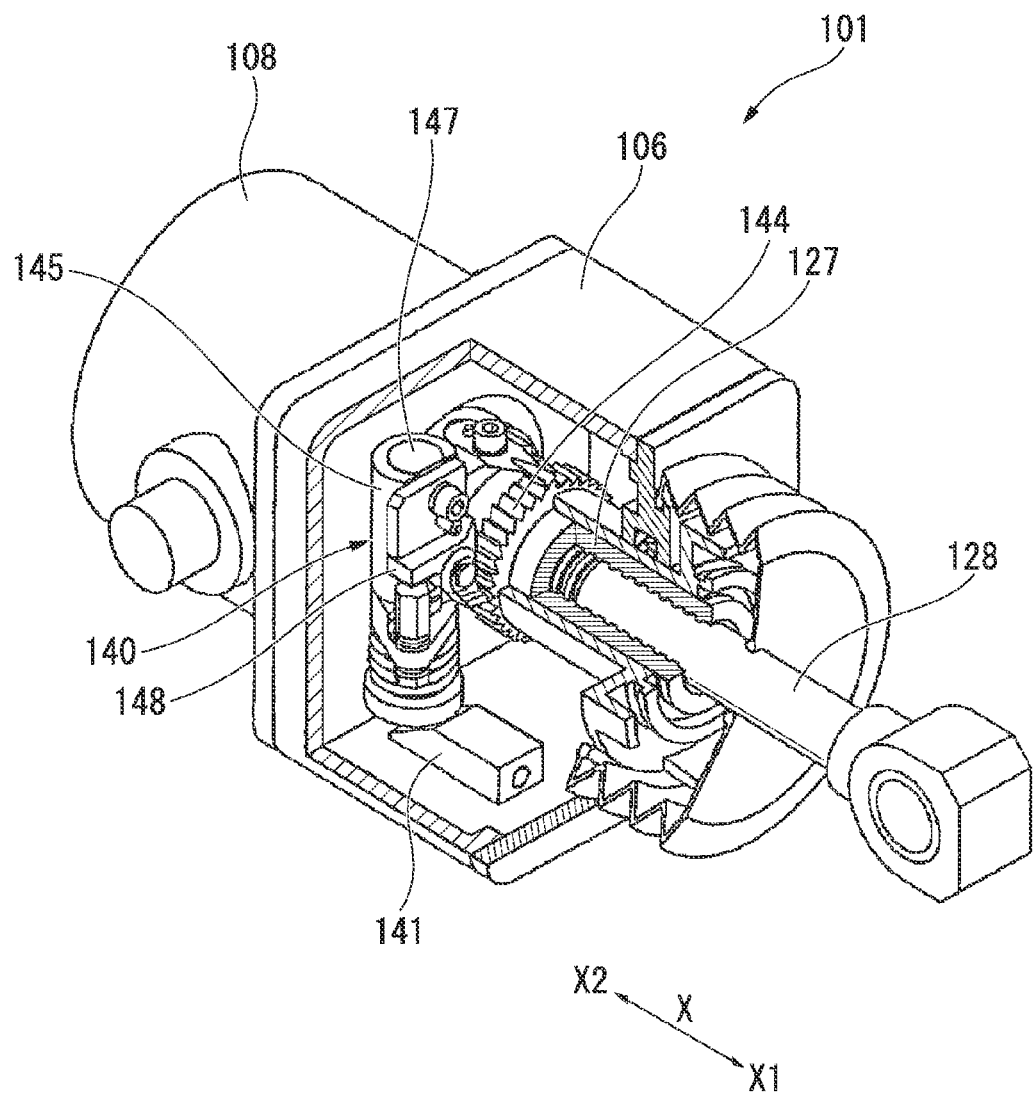
FIG. 9 is a cutaway perspective view showing the main components of an example of a brake device including a gap adjustment mechanism.
Figure 10A:
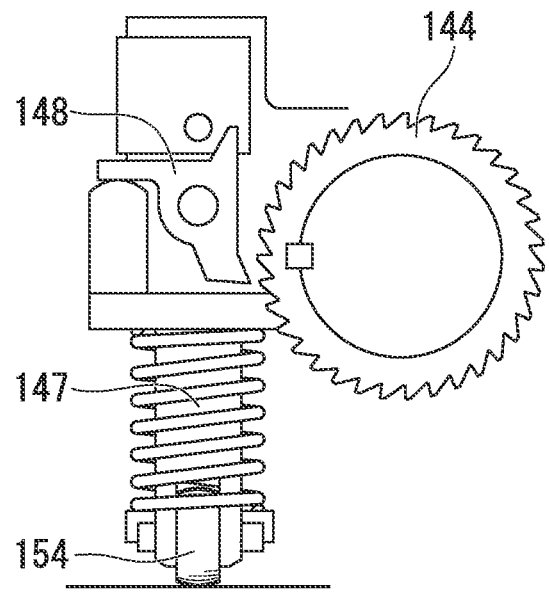
FIG. 10A to FIG. 10D are drawings for explaining the movement of an adjustment push rod when a sleeve advances towards a braking side in a braking direction.
Figure 10B:
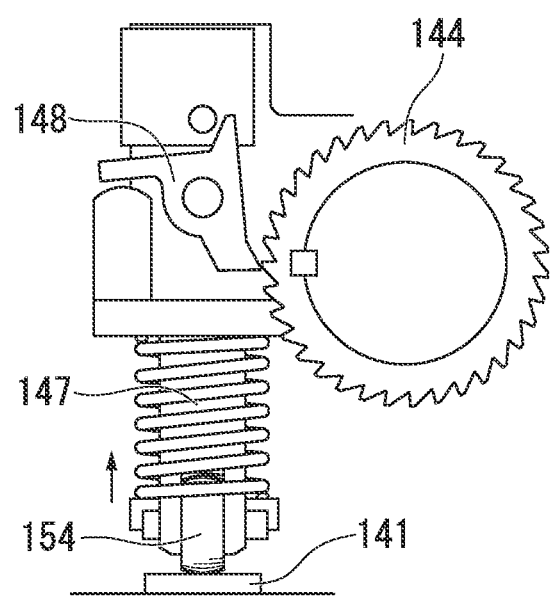
Figure 10C:
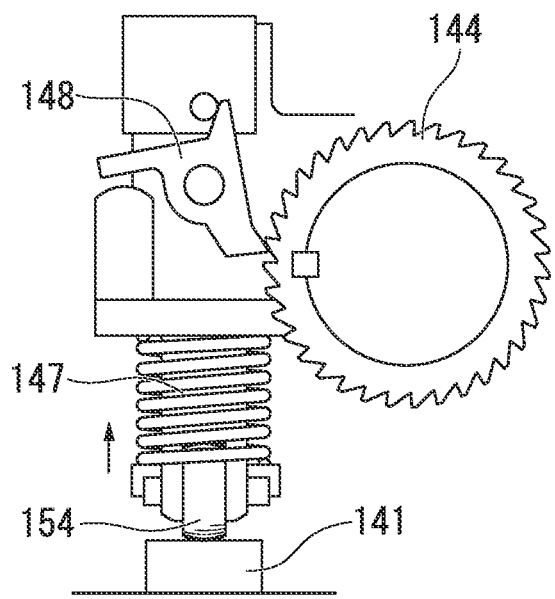
Figure 10D:
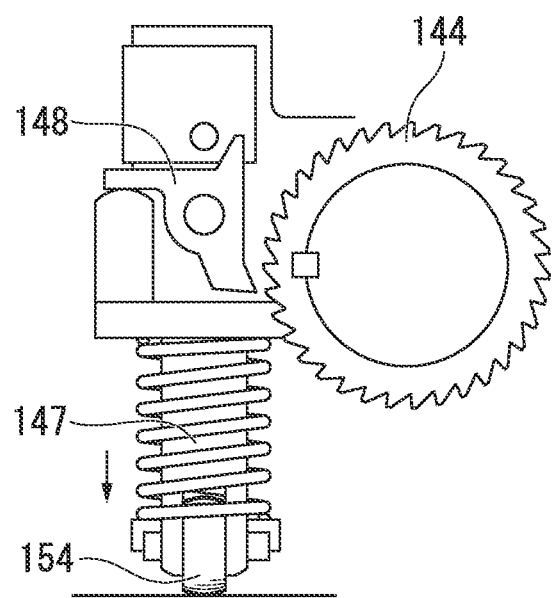
Figure 11:
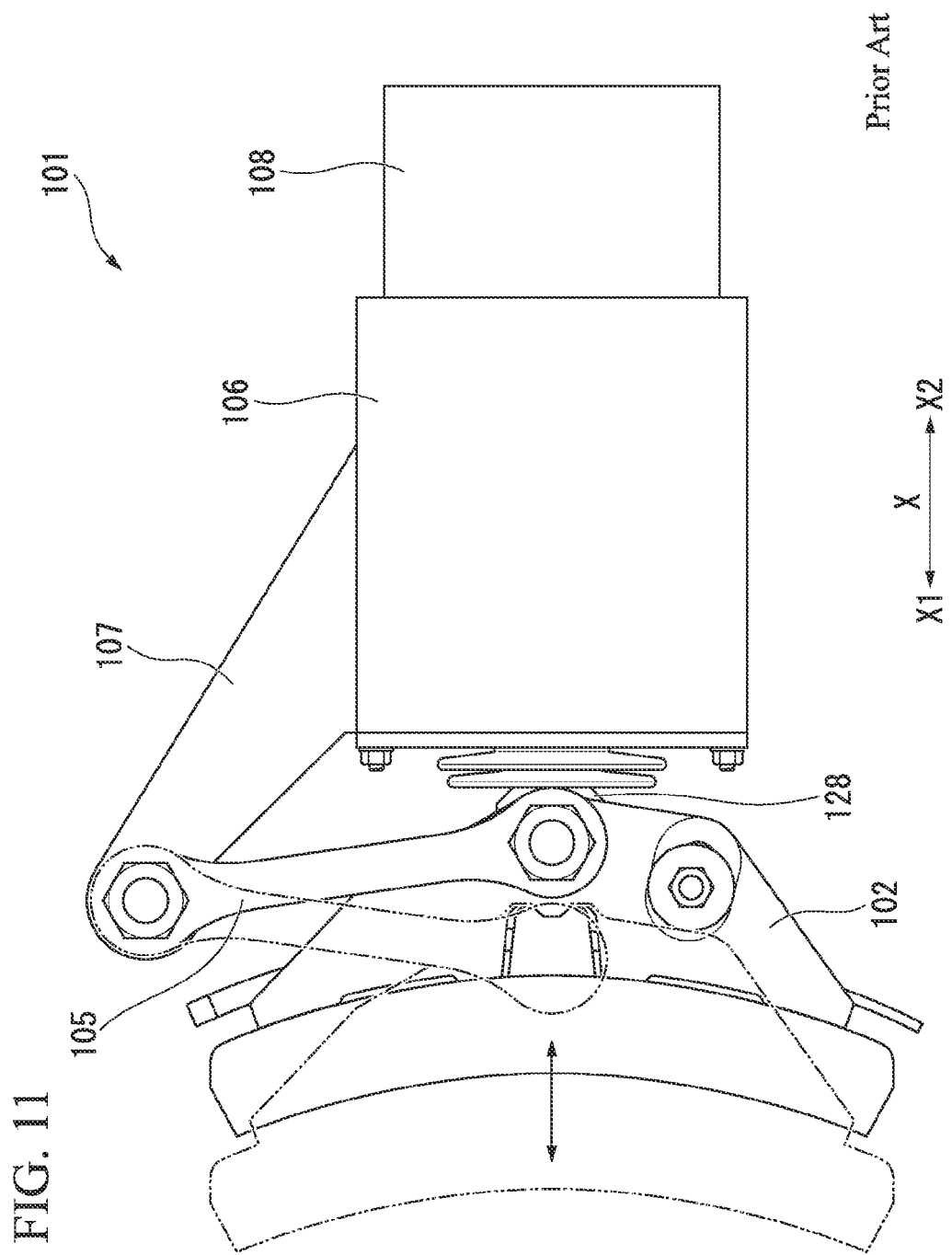
FIG. 11 shows a curved stroke of a leading end section of the push rod, centered on a leading end of the arm section.
Figure 12A:
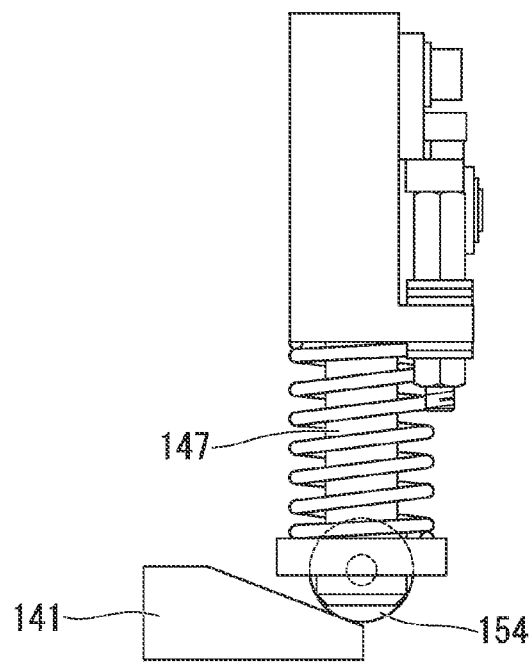
FIG. 12A shows the adjustment push rod, showing the adjustment push rod at an initial stroke position in a case where there is no wear of a tread surface.
Figure 12B:
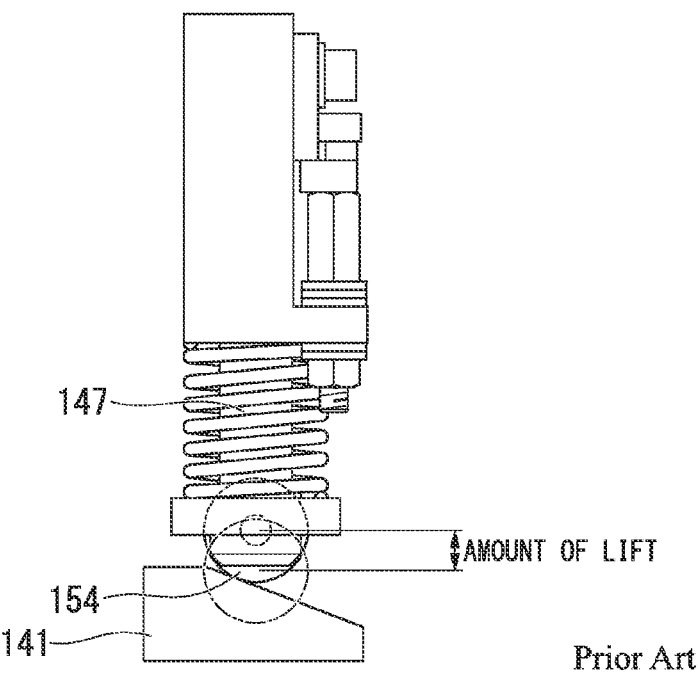
FIG. 12B shows the adjustment push rod, showing the adjustment push rod at a braking position.
Figure 13:
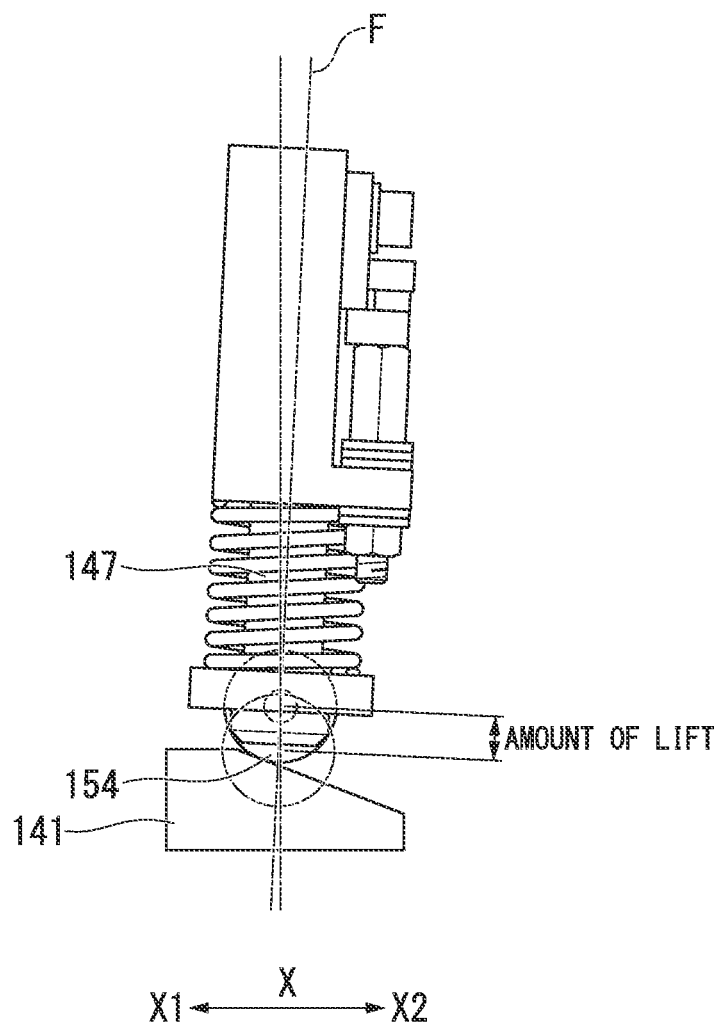
FIG. 13 shows the adjustment push rod at the braking position in a case where wear of the tread surface has progressed.

FIG. 7A shows the relationship between the hexagonal cam 41 and the adjustment push rod 47, at the standby position of the brake device 1. At the standby position, the first roller 42 of the lever member 49 is separated from the control surfaces 66 of the hexagonal cam 41. As a result, the adjustment push rod 47, by the urging force of the compression coil spring 56, is positioned at the farthest extent of the release side (the bottom of FIG. 7A).

Figure 7B:
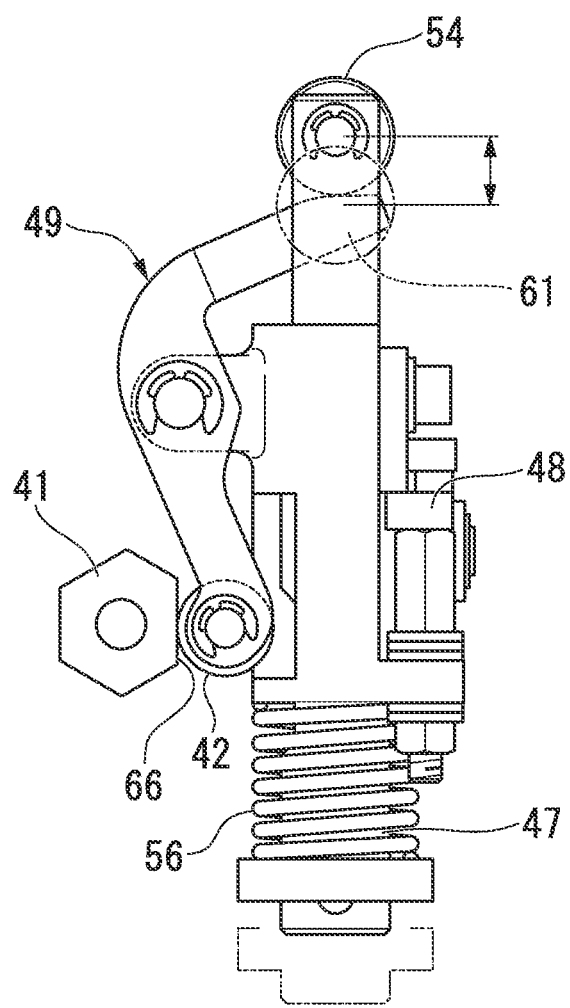

As shown in FIG. 7B, when the brake device 1 is operated, movement of the push rod 28 towards the braking side X1 in the braking direction causes the lever member 49 to move, and the first roller 42 to contact the control surface 66 of the hexagonal cam 41. This contact of the first roller 42 with the control surface 66 causes the first roller 42 to relatively move towards the opposite side X2 to the braking side in the braking direction, thereby causing the lever member 49 to rotate about the pin 60. As a result, the drive piece 61 provided at the other end of the opposite side of the lever member 49 from the first roller 42 moves the second roller 54 in the application direction of the adjustment push rod 47 (upward in FIG. 7B).

At this time, if the gap between the tread surface W and the brake shoe 2 is within a prescribed value, that is, if the movement amount of the push rod 28 is within a prescribed value, the movement of the pawl member 48 that accompanies movement of the adjustment push rod 47 is insufficient for the pawl 58 of the pawl member 48 to ride over a tooth of the ratchet gear 44, and when braking of the brake device 1 is released, the adjustment push rod 47 returns to its initial position. That is to say, the braking operation is completed without the pawl 58 causing the ratchet gear 44 to turn.

On the other hand, if the gap between the tread surface W and the brake shoe 2 exceeds the prescribed value, then when the push rod 28 moves towards the braking side X1 in the braking direction, the second roller 54 of the adjustment push rod 47 moves a significant distance towards the activation side of the adjustment push rod 47, thereby causing the pawl 58 of the pawl member 48 to ride over a tooth of the ratchet gear 44. If from this state, braking of the brake device 1 is released, the pawl 58 resists the flat spring 44a suppressing the ratchet gear 44 and rotates the ratchet gear 44 by one tooth only.

With this rotation of the ratchet gear 44, the sleeve 27 connected to the ratchet gear 44 by a key (not shown) also rotates. At this time, because rotation of the push rod 28 threadably connected to the sleeve 27 is restricted by the hanger 5 and the like, the push rod 28 does not rotate and is pushed out in the braking direction X. That is to say, movement of the push rod 28 towards the braking side in the braking direction decreases the distance between the tread surface W and the brake shoe 2.

If large amounts of wear of the tread surface W causes gap adjustment to occur repeatedly, the initial stroke position of the brake device 1 moves significantly towards the braking side in the braking direction.

In this case, although the stroke of the push rod 28 is substantially along the braking direction X, technically the stroke presents a curve with a center of rotation at the connecting pin 31. Therefore, if the tread surface W suffers a large amount of wear, and the initial stroke position moves towards the braking side in the braking direction, the axial direction of the push rod 28 and the sleeve 27 presents a slight incline relative to the movement direction (braking direction X) of the sleeve holding member 25. Accordingly, as shown in FIG. 8, the sliding direction S of the adjustment push rod 47 is also slightly inclined relative to a direction (indicated by T in the figure) orthogonal to the movement direction of the sleeve holding member 25.

In the brake device 1 of the present embodiment, the control surfaces 66 are provided so as to remain orthogonal to the braking direction X even when, for example, the initial stroke position has moved by 90 mm from the initial position prior to wear of the tread surface W, that is to say, the axis of the adjustment push rod 47 has inclined due to the stroke of the push rod 28 becoming curved. Consequently, the control surface 66 of the hexagonal cam 41 moves the adjustment push rod 47 by an amount corresponding to the relative movement amount of the first roller 42 constituting the lever member 49. That is to say, the first roller 42 is pushed back by a distance equivalent to the movement amount of the push rod 28, and the second roller 54 is lifted via the lever member 49 by a corresponding amount. As a result, a constant gap can be maintained between the tread surface W and the brake shoe 2 without regard to the curved stroke of the push rod 28.

Furthermore, because rotation of the hexagonal cam 41 changes the distance between the control surface 66 and the first roller 42, the distance of the first roller 42 to the control surface 66 can be easily changed. That is to say, the gap adjustment mechanism 40 can be adjusted easily.

The technical scope of the present invention is in no way limited by the examples presented above, and various modifications may be made without departing from the gist of the present invention.

For example, in the embodiment described above, the hexagonal cam 41 constituting the control surfaces 66 has a hexagonal column shape. However the shape is not limited to this, and may be square or octagonal column shape instead.

The invention is not to be considered as being limited by the foregoing description, and is only limited by the scope of the appended claims.

What is claimed is:

1. A brake device comprising:
   a damper which applies a braking force to a braking target by advancing towards and contacting the braking target;
   an advancing and retreating member which causes the damper to advance and retreat in a braking direction towards the braking target;
   a casing which supports the advancing and retreating member such that the advancing and retreating member is movable for advancing and retreating in the braking direction; and
   a gap adjustment mechanism which adjusts an initial position of the damper and the advancing and retreating member;
   wherein the gap adjustment mechanism comprises:
   a control section rotatably mounted to the casing via a shaft and having a control surface facing an opposite side to the braking side in the braking direction,
   an operation member which is formed in a circular shape and is capable of advancing and retreating in the braking direction together with the advancing and retreating member, and whose movement is controlled by contacting the control surface with an outer peripheral surface of the operation member as the advancing and retreating member advances towards the braking side in the braking direction, thereby enabling relative movement with respect to the advancing and retreating member towards the opposite side to the braking side in the braking direction, and a position adjustment section which, when the advancing and retreating member advances towards the braking side in the braking direction by a predetermined advance amount or more and the operation member relatively moves by a predetermined amount with respect to the advancing and retreating member, changes the initial position of the advancing and retreating member according to the relative movement amount of the operation member;

wherein the position adjustment section comprises a sleeve which is axially rotatable about an axis extending in the braking direction and whose inner peripheral surface is threadably engaged with the advancing and retreating member, a ratchet gear which is axially rotatable about the axis extending in the braking direction together with the sleeve, a lever member which is rotatable with movement of the operation member, about a fulcrum that advances and retracts in the braking direction together with the advancing and retreating member, wherein the operation member is provided at a distal end of the lever member, and a pawl arranged to be movable for advancing and retracting in a predetermined direction according to the rotation of the lever member, and which turns the ratchet gear by moving towards an application side in a predetermined direction while engaged with the ratchet gear;

wherein the control section is formed in a polygonal column shape, and an outer periphery of the polygonal column shape includes a plurality of peripheral surfaces; and wherein the peripheral surfaces of the polygonal column shape are formed at different distances, respectively, from the shaft of the control section.

2. A brake device according to claim 1, wherein at least one of the plurality of peripheral surfaces is capable of being selected as the control surface by performing axial rotation about the shaft.

\* \* \* \* \*